Sept. 11, 1962    R. E. WAHLEN    3,053,036
DUMPING HAY RAKE
Filed Oct. 17, 1960    3 Sheets-Sheet 2
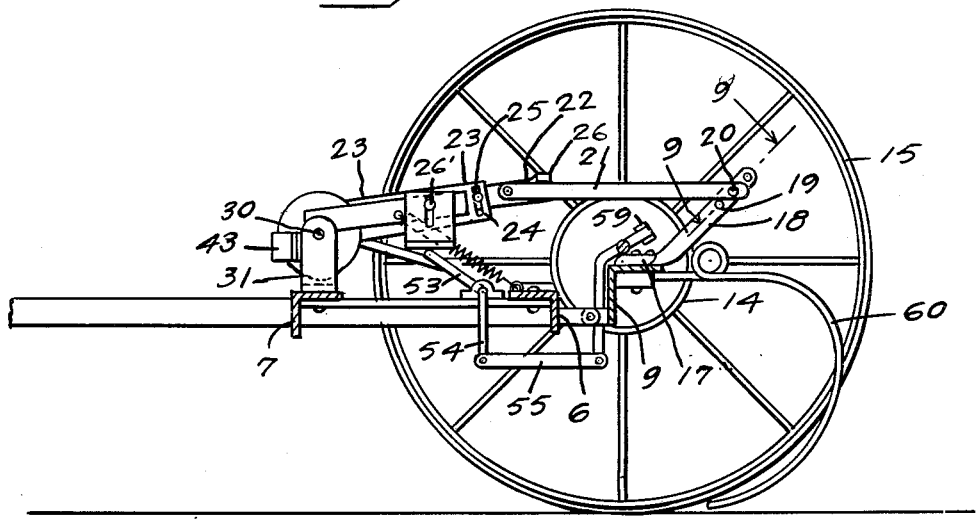
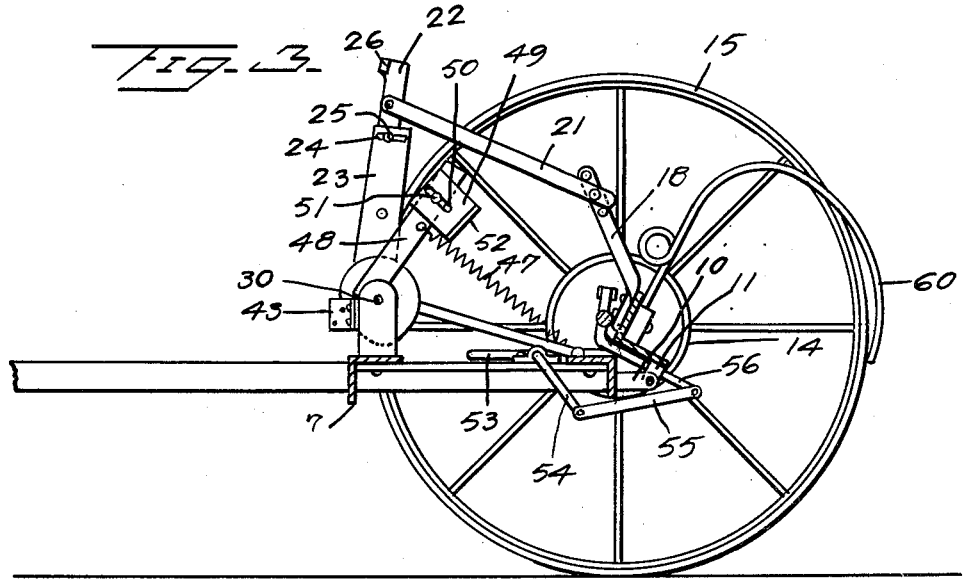
RAYMOND E. WAHLEN
INVENTOR
BY *CA Snow & Co.*
ATTORNEYS.

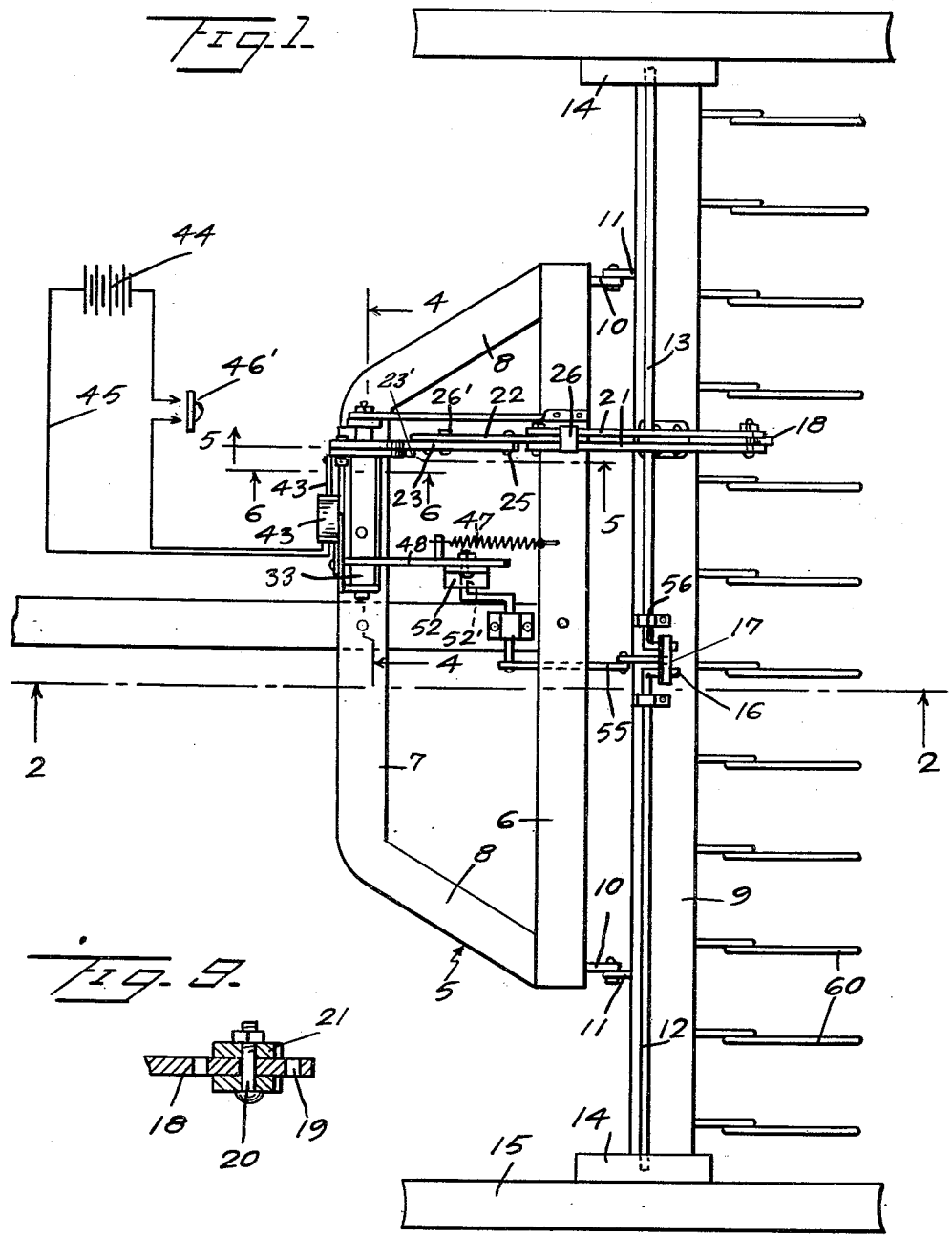

Sept. 11, 1962  R. E. WAHLEN  3,053,036
DUMPING HAY RAKE
Filed Oct. 17, 1960  3 Sheets-Sheet 3
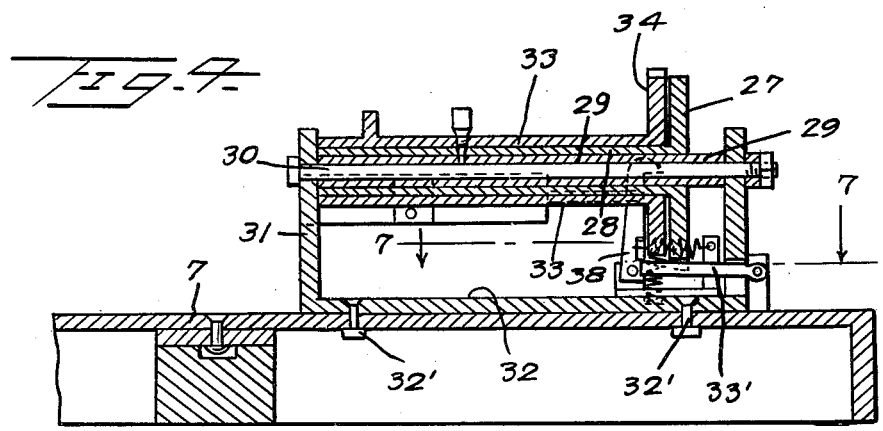
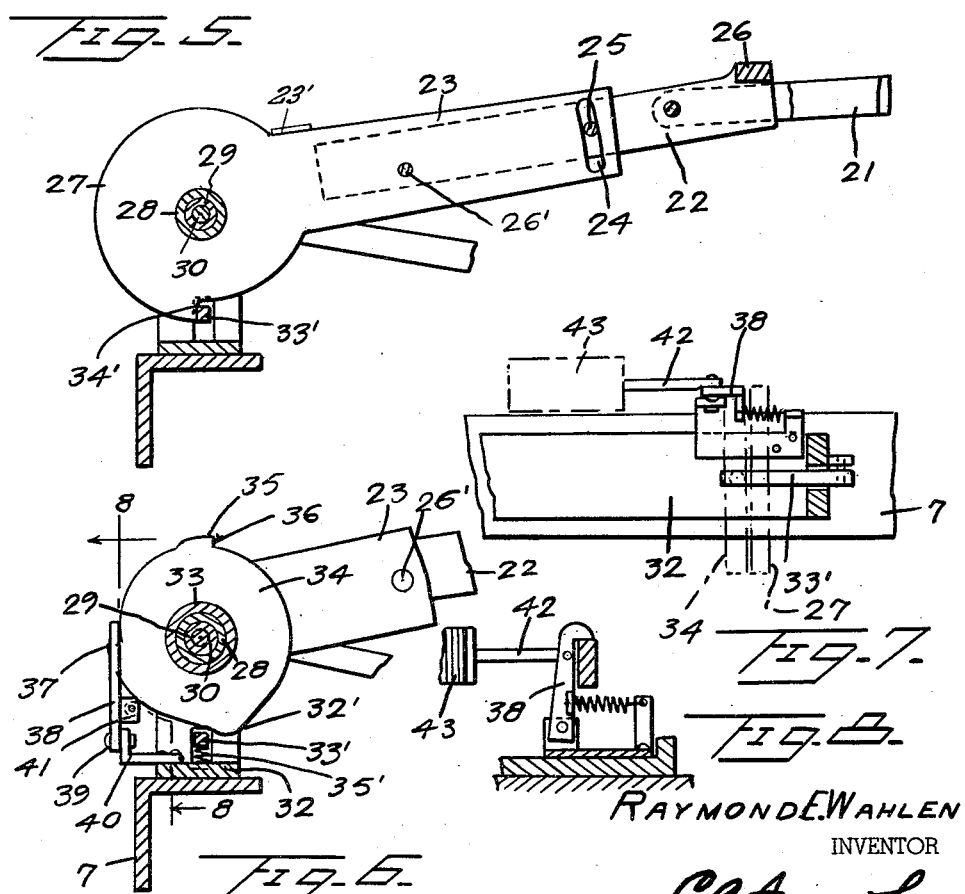
RAYMOND E. WAHLEN
INVENTOR
BY *C.A. Snow & Co.*
ATTORNEYS.

United States Patent Office 3,053,036
Patented Sept. 11, 1962

3,053,036
DUMPING HAY RAKE
Raymond E. Wahlen, Faulkton, S. Dak.
Filed Oct. 17, 1960, Ser. No. 62,909
4 Claims. (Cl. 56—386)

This invention relates to hay rakes and more particularly to hay rakes wherein the rake assembly is movable vertically by means of a pedal, located adjacent to the operator's seat.

An important object of the invention is to provide an electrically controlled mechanism for imparting rake actuating movement to the rake assembly, elevating or moving the rake assembly to a dumping position, thereby operating the rake assembly with a minimum amount of effort on the part of the operator.

Another important object of the invention is to provide a rake operating mechanism which will normally lock the rake assembly in a raking position, and readily release the rake assembly for dumping the load.

Other objects will in part be obvious and in part be pointed out as the description of the invention proceeds, and shown in the accompanying drawings.

In the drawings:

FIGURE 1 is a plan view of a hay rake equipped with a rake operating mechanism, constructed in accordance with the invention.

FIGURE 2 is a sectional view taken on line 2—2 of FIGURE 1.

FIGURE 3 is a sectional view illustrating the position of the elements in the dumping of the load.

FIGURE 4 is an enlarged sectional view taken on line 4—4 of FIGURE 1.

FIGURE 5 is an enlarged sectional view taken on line 5—5 of FIGURE 1.

FIGURE 6 is an enlarged sectional view taken on line 6—6 of FIGURE 1.

FIGURE 7 is a sectional view taken on line 7—7 of FIGURE 4.

FIGURE 8 is a sectional view taken on line 8—8 of FIGURE 6.

FIGURE 9 is an enlarged sectional view taken on line 9—9 of FIGURE 2.

Referring to the drawings in detail, the main frame of a hay rake is indicated generally by the reference character 5, the frame embodying a rear bar 6, and a front bar 7, the bars 6 and 7 being connected by the laterally extended end sections 8 of the frame.

The reference character 9 indicates the tooth supporting main beam of the rake which is constructed preferably of channel bar material, as better shown by FIGURES 2 and 3 of the drawings.

This main beam 9 is of a length so that the end portions 9' and 9" thereof extend substantial distances beyond the ends 6' and 6" of the rear bar 6 of the frame, the frame 5 being connected to the main beam 9, by means of the arms 10 that are connected to the rear bar 6, and have pivotal connection with the arms 11 that extend forwardly from the main beam 9, as shown by FIGURE 1 of the drawings.

The outer ends of rods 12 and 13 engage conventional rake lifting dogs, not shown, similar to the arrangement shown in the patents to Todd, 489,921, June 6, 1893, and Dixon, 320,766, June 23, 1885, and which are located in housings 14 adjacent to wheels 15. Rods 12 and 13 have their inner ends terminated adjacent to the center of the beam 9, the adjacent ends of the rods 13 extending laterally as at 16, where they are connected by means of the plate 17 secured thereto, so that the operation of the beam 9 around the rods 12 and 13 will be permitted.

The plate 17 is bolted to the main beam 9, which beam 9 provides a support for the arm 18 which extends from the beam 9 at an oblique angle, the arm 18 being formed with a line of openings 19 through which the bolt 20 passes, the bolt 20 also passing through openings in the arms 21, which are disposed on opposite sides of the arm 18, as shown by FIGURE 9 of the drawings.

The arms 21 are pivotally connected with the arm 22 that in turn is pivotally connected with the arm 23 of the rake actuating mechanism, the arm 23 having an elongated opening 24 in which the stop pin 25, which is secured to the arm 22, is located, the stop pin 25 being designed to move throughout the length of the elongated opening 24, for purposes to be hereinafter more fully described.

Extending from the upper rear end of the arm 22, is a cross bar or lug 26 against which the arms 21 engage, limiting the pivotal movement between the arms 21 and arm 22, in a downward direction.

The arm 22 has pivotal connection with the arm 23, through the bolt 26', which is shown as extending through aligning openings formed in the arms 22 and 23.

The arm 23 is formed with an enlargement 27 preferably of circular formation, is provided with a stop in the form of a shoulder 34', the enlargement being formed at one end of the tubular shaft 28 that in turn is mounted on the tubular shaft 29 through which the shaft 30 extends, the shaft 30 having its ends mounted in the upwardly extended bearing arms 31, formed at the ends of the bracket 32, which in turn is bolted to the front bar 7 of the frame 5, by means of bolts 32'.

Forming an integral part and disposed at one end of the tubular shaft 33 is a circular enlargement 34 that is formed with an offset portion that provides a shoulder 37 engaged by the latch 38, which is pivotally mounted at 39 on the bracket 40 that extends laterally from the front bar 7 of the hay rake frame.

A cam 36' is also provided on the peripheral edge of the enlargement 34, which moves into contact with the dog 33' which is normally biased into contact with the edge of said member 34, by spring 35' mounted directly thereunder. The dog 33' normally engages in notch 34' formed in the periphery of enlargement 27, which temporarily locks said member 27 against movement.

Extending laterally from the pivoted latch 38 is a plate 41 to which armature 42 of the solenoid 43 is secured, the solenoid 43 being in circuit with the battery 44 of the hay rake, through the wires 45 and switch 46, the switch being located in proximity to the operator's seat whereby the operator will have easy access thereto. Thus it will be seen that due to this construction, when the switch 46 is operated to complete the circuit to the solenoid 43, armature 42 will be retracted, with the result that the latch 38 will be withdrawn from the shoulder on which it is resting, releasing the arm 23 and arms pivotally mounted thereon, to the action of the coiled spring 47 which is better shown by FIGURE 1 of the drawings as having one of its ends secured to the rear bar 6 of the frame, while the opposite end thereof is connected with the arm 48 connected to one end of the tubular shaft 33, to be hereinafter more fully described.

Secured to the arm 48, is a plate 49 which is provided with an elongated opening 50 through which the bolt 51 extends, the bolt 51 being secured to the arm 48 so that the plate 49 may be adjusted to the desired location with respect to the arm 48 for purposes to be hereinafter more fully described. The plate 49 is formed with an offset or laterally extended flange which is disposed so that upon downward movement of the arm 48, the flange 52 will engage the conventional foot pedal 52' formed on one end of the rod 53, the foot pedal embodying an arm 54 that has pivotal connection with a link 55 that connects with rod 56 so that movement of said pedal 52' will cause the outer ends of rods 12 and 13, to which rod 56 is connected, to engage the lifting dogs (not shown) in hubs 14 lifting the rake teeth to their dumping positions.

From the foregoing it will be obvious that when the switch 46' is operated to complete the electrical circuit to the solenoid 43, the arm 42 will be drawn into the solenoid winding, withdrawing the latch 38 from the shoulder 37, and releasing member 34 and tubular shaft which are spring loaded by spring 47, and free to rotate. As the right angled plate moves downwardly, the flange 52 extending laterally from plate 49 moves into contact with the foot pedal directly thereunder, pressing the foot pedal downwardly causing actuation of the dumping mechanism to move the rake to the dumping position as shown by FIGURE 3. As member 34 rotates to trip the conventional rake dumping mechanism, cam 36' formed on the member 34, contacts the lock dog 33', releasing the lock dog 33' from shoulder 34' of the enlargement 27. The lock dog 33' is now biased against cam 32' and shoulder 34', by spring 35'.

The hay rake is now tripped, and the hold down lock having been released, the hay rake is released and is free to dump the hay load, which is accomplished through the engaged dogs, not shown, and which form a part of the wheels of the conventional hay rake.

The arm 23 is provided with a reloading lug 23', as shown in FIGS. 1 and 5, which extends substantially perpendicularly therefrom in overlying relation to the peripheral edge of member 34. The member 34 is provided with an offset portion 35 defining a shoulder 36. When the rake is raised to the dumping position the arm 23 will be moved to the position shown in FIGURE 5 by movement of the rake transmitted through arms 18, 21, and 22. As the arm 23 is raised the reloading lug 23' engages the shoulder 36 on member 34 causing rotation of the same, tubular shaft 33, and movement of arm 48 against the bias of spring 47. When the member 34 reaches the position shown in FIGURE 6 the latch 38 engages shoulder 37 holding the member 34, tubular shaft 33, and arm 48 against the bias of spring 47 until the operator actuates switch 46 at which time the dumping cycle is repeated.

After the load is dumped the rake returns to its down or active raking position. With this movement, the shoulder 34' engages the lock dog 33', and the spring 35' forces the dog to the position temporarily locking the rake in the down or active raking position.

It might be further stated that the cross bar or link 26 is so constructed that arms 23 and 21 are normally maintained in an off central position when the teeth of the rake are down.

Having thus described the invention, I claim:

1. The combination with a hay rake embodying a main frame having a dumping mechanism and a rake tooth frame operated by a manually controlled foot pedal, of an electrically controlled mechanism including a spring loaded lifting arm pivotally connected between the main frame and rake tooth frame, a shoulder on said lifting arm, a pivoted latch engaging said shoulder normally holding said lifting arm and toothed frame in a raking position against the action of said spring, a solenoid mounted on said main frame, the armature of said solenoid being connected to said latch, wires and a switch providing an electrical circuit between said solenoid and source of electricity supply, for actuating said latch member releasing said lifting arm to the action of said spring, a plate having a laterally extended flange secured to said operating arm, said flange adapted to engage said foot pedal upon downward movement of said lifting arm operating said pedal to cause engagement of the dumping mechanism of said hay rake.

2. The combination with a hay rake embodying a main frame having a dumping mechanism, a rake tooth frame and a manually operated foot pedal, of an electrically controlled actuating mechanism including a spring loaded lifting arm pivotally connected between the main frame and rake tooth frame, a shoulder on said lifting arm, a pivoted latch engaging said shoulder normally locking said lifting arm and tooth frame in a raking position against the action of said spring, a solenoid mounted on said main frame, the armature of said solenoid being connected to said latch, wires and a switch providing an electric circuit between said solenoid and a source of electricity supply for actuating said latch member releasing said lifting arm to the action of said spring, and means on said lifting arm for contacting with said foot pedal operating said foot pedal to cause engagement of the dumping mechanism upon downward movement of said pedal, dumping the load of said hay rake.

3. An actuating mechanism for a hay rake comprised of a main frame, a rake frame embodying teeth, pivotally mounted for vertical swinging movement on said main frame, a dumping mechanism, a manually operated foot pedal for operating said dumping mechanism, said actuating mechanism embodying a spring loaded lifting arm pivotally mounted on said main frame, a latch for normally holding said arm and rake frame in a raking position, a flanged plate secured to said arm, said flange of said plate adapted to contact said foot pedal of said rake frame upon downward movement of said arm, forcing said foot pedal downwardly to operate the dumping mechanism, moving said rake to a dumping position, and an electrically controlled mechanism for releasing said arm.

4. The subject matter as claimed in claim 3, and said mechanism including a tubular shaft having a circular enlargement on one end thereof operating adjacent to said lift arm, a cam formed on the periphery of said circular enlargement, a vertically movable dog mounted on said main frame engageable in said notch normally locking said lifting arm against movement, and said cam adapted to engage said dog disengaging said dog and lifting arm, releasing said lifting arm to the action of said spring.

References Cited in the file of this patent

UNITED STATES PATENTS

| | | |
|---|---|---|
| 1,923,606 | Avilla et al. | Aug. 22, 1933 |
| 2,247,838 | Grant | July 1, 1941 |
| 2,366,234 | Blaydes | Jan. 2, 1945 |
| 2,471,713 | Baker | May 31, 1949 |
| 2,488,061 | Herman | Nov. 15, 1949 |
| 2,488,659 | Carter | Nov. 22, 1949 |